United States Patent [19]

Hashimoto et al.

[11] Patent Number: 4,745,016
[45] Date of Patent: May 17, 1988

[54] WEATHER STRIP FOR AUTOMOBILE

[75] Inventors: Hideyuki Hashimoto, Nishikasugai; Masakazu Fujiyoshi, Gifu, both of Japan

[73] Assignee: Toyoda Gosei Co., Ltd., Nishikasugai, Japan

[21] Appl. No.: 898,384

[22] Filed: Aug. 20, 1986

[30] Foreign Application Priority Data

Aug. 26, 1985 [JP] Japan .................. 60-129808[U]

[51] Int. Cl.$^4$ .............................................. E06B 7/16
[52] U.S. Cl. ................................. 428/122; 49/490; 49/497; 428/358
[58] Field of Search ............ 49/490, 495, 496, 497; 428/122, 358; 52/716; 296/154

[56] References Cited

U.S. PATENT DOCUMENTS

| | | | |
|---|---|---|---|
| 3,638,359 | 2/1972 | Kruschwitz | 49/490 |
| 3,807,978 | 4/1974 | Niemanns | 49/441 |
| 4,030,245 | 6/1977 | Yeomans | 49/490 |
| 4,442,156 | 4/1984 | Yamaguchi | 428/122 X |
| 4,448,835 | 5/1984 | Yamaguchi | 428/147 |
| 4,603,899 | 8/1986 | Iwasa | 428/122 X |
| 4,695,499 | 9/1987 | Whitener | 428/122 |

FOREIGN PATENT DOCUMENTS 2006309 5/1979 United Kingdom ............. 49/490

Primary Examiner—Henry F. Epstein
Attorney, Agent, or Firm—Cushman, Darby & Cushman

[57] ABSTRACT

A weather strip to be installed on a flange formed along an opening of a body of an automobile, has a trim portion having a U-shaped section, a plurality of flange retaining lips, at least two flange-retaining lips of the plurality of flange lips projecting diagonally upward from each of inner surfaces of opposed side walls of the trim portion, a seal portion formed in an outer surface of the trim portion to be come in contact with a closing member for closing the opening of the body of the automobile and a body seal lip projecting from an outer surface of one of the opposed side walls of the trim portion, which is to be positioned on the outer side of the opening when the weather strip is installed on the flange. A tip end of the body seal lip comes in contact with a surface of the body of the automobile, and each of one flange retaining lip formed in the upper inner surface of one of said opposed side walls, from which said body seal lip projects, and another flange retaining lip formed in the lower inner surface of the other one of the opposed side walls has a sub-lip extending toward the inner surface of each of the opposed side walls.

7 Claims, 2 Drawing Sheets

WEATHER STRIP FOR AUTOMOBILE

BACKGROUND OF THE INVENTION

1. Field of the Invention

The present invention relates to a weather strip to be installed around the perimeter of an opening of a body of an automobile.

2. Description of the Prior Art

Weather strips are installed around the perimeter of an opening of a trunk space, a rear door or the like for sealing gaps between these openings and the trunk lid or the rear door.

FIG. 3 illustrates a weather strip of the above-described type, which has been conveniently used for sealing and FIG. 4 illustrates the state where the weather strip shown in FIG. 3 is installed in an automobile.

In a trim portion 1 having a U-shaped cross-section, made of solid rubber are formed a plurality of flange-reataining lips 2a, 2b, 2c and 2d.

The flange-retaining lips 2a and 2b are formed in the inner surface of one side wall of the trim portion 1 and project obliquely upward. And the flange-retaining lips 2c and 2d are formed in the inner surface of the other side wall of the trim portion 1 like the retaining lips 2a and 2b.

A hollow seal member 3 made of sponge rubber is formed in the upper surfce of the trim portion 1 and a closing member 7 such as a trunk lid, a rear door and the like comes in pressurized, i.e. resiliently deflected contact with the hollow seal member 3.

A body seal lip 4 made of sponge rubber is formed in the outer surface of the side wall of the trim portion 1, which is positioned outside the opening of an automobile body when the trim portion 1 is installed in the body along the opening thereof, and comes in pressurized, i.e. resiliently deflected contact with a body surface 60.

When the trim portion 1 of the weather strip is installed on a flange 6 by inserting the flange 6 into the trim portion 1, the trim portion 1 is pushed toward the automobile body and the seal lip 4 is pressed against the body surface 60. This results in the body surface producing a reaction force and accordingly a rotating force in the direction of the body opening being applied to the trim portion 1 so that the trim portion 1 is inclined, i.e. cocked. Therefore, even if the body seal lip 4 is strongly pressed against the body surface 60 in the weather strip installation step, a sufficiently large sealing force cannot be obtained in the body seal lip 4. And the inclination of the trim portion 1 results in the inner surface of the side walls, from which the retaining lips 2a and 2d project, separating from the flange 6 and accordingly, the sealing force of the retaining lips 2a and 2d being decreased. The inclination of the trim portion 1 also results in the inner surfaces of the side walls, from which the retaining lips 2b and 2c project, approaching the flange 6 and accordingly, the retaining lips 2b and 2c being excessively pressed against the flange 6.

Consequently, when water enters the gap between the body seal lip 4 and the body surface 60, the water easily rises through the gap between the flange 6 and the retaining lip 2a.

In addition, the inclination of the weather strip is undesirable since it diminishes good appearance of the weather strip.

SUMMARY OF THE INVENTION

One object of the present invention is to provide a weather strip having excellent sealing property.

Another object of the present invention is to provide a weather strip of which the trim portion is prevented from being inclined when the trim portion 1 is installed in the flange 6.

The weather strip of the present invention comprises a trim portion having a U-shaped section, a plurality of flange-retaining lips which project obliquely upward from the inner surfaces of opposed side walls of the trim portion, a seal portion formed in an upper outer surface of the trim portion to come in contact with a closing member for closing an opening of a body of an automobile, and a body seal lip projecting from an outer surface of one of the opposed side walls of the trim portion, which is to be positioned on the outer side of the opening when the weather strip is installed along the opening. The flange-retaining lip formed in the upper inner surface of one side wall from which the body seal lip projects and the flange-retaining lip formed in the lower inner surface of the opposed side wall are provided with a sub-lip, respectively. Each sub-lip extends in a direction nearly perpendicular to the extending direction of the flange-retaining lip toward the inner surface of each of the side walls.

When the flange is inserted between the retaining lips and the trim portion is pushed onto the flange, the sub-lips laterally deflect into contact with the inner surfaces of the side walls, thereby to prevent the inner surfaces of the trim portion from approaching the flange. This results in the inclination of the trim portion being prevented and the pressurized, i.e. resilient contact force of the body seal lip to the body surface being increased so that the sealing property is improved.

BRIEF DESCRIPTION OF THE DRAWINGS

FIG. 1 is a sectional view of one embodiment;

FIG. 2 is a sectional view of one embodiment of the weather strip, which is installed in a flange;

FIG. 3 is a sectional view of the conventional weather strip; and

FIG. 4 is a sectional view of the conventional weather strip which is installed in a flange.

DETAILED DESCRIPTION OF THE INVENTION

Figure 1:
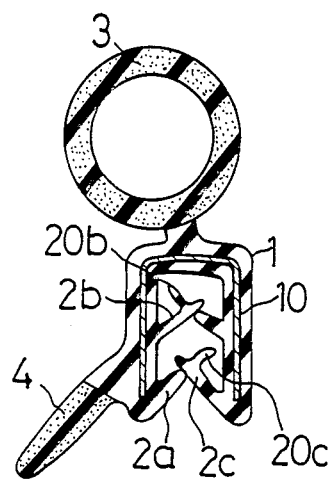
FIGS. 1 and 2 illustrate one embodiment of a weather strip according to the present invention.
Figure 2:
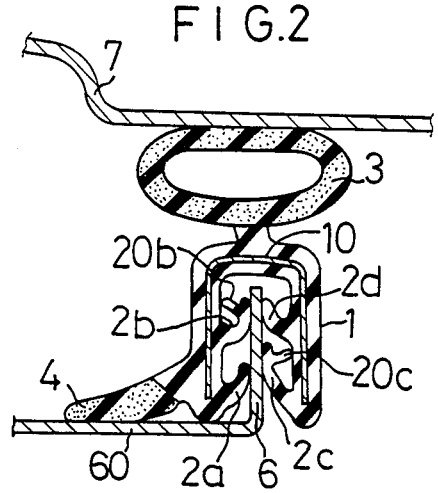
Figure 3:
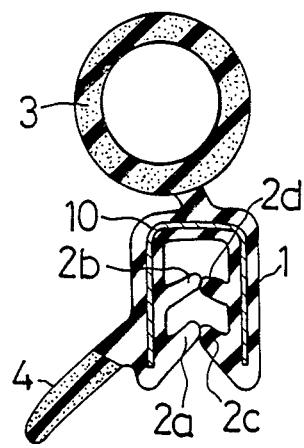
FIGS. 3 and 4 illustrate a conventional weather strip.

FIGS. 1 and 2 illustrate one embodiment of a weather strip according to the present invention.

In FIGS. 1 and 2, a trim portion 1 has a U-shaped section made of solid rubber and a metal core 10 is embedded in the trim portion 1. Resilient, flexible flange retaining lips 2a and 2b project obliquely upward from one of opposed side walls and flange-retaining lips 2c and 2d project obliquely upward from the other one of opposed side walls. A flange 6 is inserted between the retaining lips 2a and 2c and between the retaining lips 2b and 2d thereby deflecting them laterally apart relative to an imaginary medial plane bisecting the U-shaped section.

A body seal lip 4 made of sponge rubber projects from the outer surface of the side wall of the trim portion 1, which is to be positioned on the outer side of a body opening when the weather strip is installed on the flange 6.

A hollow seal portion 3 made of sponge rubber which is to come in pressurized, i.e. resilient contact with a closing member 7, projects from the upper end of the trim portion1. The retaining lip 2b, positioned above the retaining lip 2a on the outer side of the body opening, is provided with a sub-lip 20b in the upper surface of the tip portion thereof. The sub-lip 20b extends in a direction perpendicular to the extending direction of the retaining lip 2b toward the inner surface of the side wall.

The retaining lip 2c positioned below the retaining lip 2d and diagonally opposed to the lip 2b, is provided with a sub-lip 20c in the upper surface of the tip portion thereof. The sub-lip 20c extends toward the inner surface of the side wall in a direction perpendicular to the extending direction of the retaining lip 2c.

Figure 4:
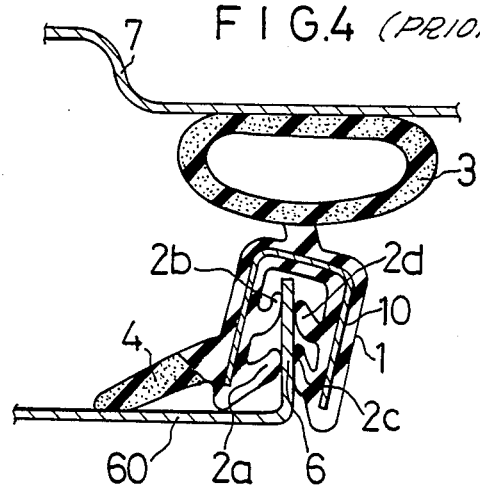

When the flange 6 is inserted onto the trim portion 1 and the trim portion 1 is pushed toward the automobile body, the body seal lip 4 is pressed against the body surface 60, and the trim portion 1 starts to be cocked to the right due to the reaction force from the body surface 60 as shown in FIG. 4. At this time, the sub-lips 20b, 20c come in contact with the opposed inner surfaces of the trim portion 1. This results in the sub-lips 20b and 20c supporting the inner surface of the trim portion with respect to the flange 6, and accordingly, the trim portion 1 is not inclined when the trim poriton 1 is pressed against the body surface 60.

Consequently, the body seal lip 4 is strongly pressed against the body surface 60 so that the sealing property is improved.

Furthermore, since the trim portion 1 is prevented from being inclined, the good appearance of the weather strip is maintained.

The body surface 60 is out-of-level at welded points or the like. This results in that minute gaps are apt to be produced between the uneven body sruface 60 and the body seal lip 4 of the conventional weather strip.

In contrast, in the weather strip of the present invention, the pressurized contact force of the body seal lip 4 can be increased so that the gaps between the body seal lip 4 and the body surface 60 can be eliminated or remarkably decreased.

For convenience in description, the axis normally of the plane of the aperture through the wall of the automobile body which is openably closable by the closure panel is herein termed the longitudinal axis, the direction that the closure panel moves to obstructingly close the aperture being arbitrarily designated the longitudinally inward direction and the direction that the closure panel moves to non-obstructively open the aperture being the longitudinally outward direction, again for convenience in description.

What is claimed is:

1. A weather strip to be installed on a flange formed along an opening of a body of an automobile comprising:
    a trim portion having a U-shaped section;
    a plurality of flange-retaining lips, at least two flange-retaining lips of said plurality of flange-retaining lips projecting obliquely upward from each of inner surfaces of opposed side walls of said trim portion;
    a seal portion formed in an outer surface of said trim portion to be come in contact with a closing member for closing the opening of the body of the automobile;
    a body seal lip projecting from an outer surface of one of said opposed side walls of said trim portion, which is to be positioned on the outer side of the opening when the weather strip is installed on the flange until a tip end of said body seal lip comes in contact with a surface of the body; and
    each of one of said plurality of flange-retaining lips, formed in the upper inner surface of one of said opposed side walls, from which said body seal lip projects, and another one of said plurality of flange retaining lips, which is formed in the lower inner surface of the other one of said opposed side walls, having a respective sub-lip extending toward the inner surface of a respective one of said opposed side walls and being disposed to be urged into contact with the respective said inner surface of the respective said side wall when said weather strip is installed on said flange.

2. A weather strip according to claim 1, wherein:
    each said sub-lip extends from the upper surface of a tip end portion of the respective said flange retaining lip in a direction perpendicular to the extending direction of the respective said flange retaining lip and a tip end of each said sub-lip is opposed to the respective said inner surface throughout a respective small interval.

3. A weather strip according to claim 1, wherein:
    said weather strip is installed on a flange formed along an opening of a trunk space of an automobile.

4. A weather strip according to claim 1, wherein:
    said weather strip is installed on a flange formed along an opening of a rear door of an automobile.

5. A weather strip for use about the perimeter of a closable opening of the body of an automobile, particularly where the automobile opening comprises an aperture through a wall, with the wall having an outer surface which bounds the perimeter of the aperture, there being a flange based on said wall and protruding outwardly from said wall about the perimeter of said aperture so as to have an upstanding free edge; and a closure panel which is broader than said aperture and which may be moved towards and away from said flange for obstructingly closing, and non-obstructively opening said aperture,
    said weather strip comprising:
    an automotive body trim member having a U-shaped transverse cross-sectional shape comprising two laterally-spaced opposite side walls with an end wall extending transversely between said side walls so as to define a longitudinally inwardly-opening channel, across which said side walls confront one another; each said side wall having an inner surface extending with said channel;
    at least two resilient, flexible flange-retaining lips based on the respective inner surface of each of said side walls, longitudinally inwardly of said end wall and extending obliquely longitudinally outwardly from the respective side wall on which it is based, so that each said flange-retaining lip has a free end disposed nearer an imaginary medial plane bisecting said channel and nearer said end wall of said channel, and a base end disposed on the respective side wall further from said imaginary medial plane, and further from said end wall; said flange-retaining lips on each said side wall being based thereon at respective sites which are spaced longitudinally from one another, so that on each said side wall, at least one said flange-retaining lip is a longitudinally inner lip and at least another said flange-retaining lip is a longitudinally outer lip; each said lip between the base end thereof and the free end thereof having a longitudinally inner face and a longitudinally outer face;

a first sub-lip based on the longitudinally outer face of a said longitudinally inner lip on one of said side walls and extending laterally therefrom, relative to said imaginary medial plane, to a respective laterally outer free end thereof;

a second sub-lip based on the longitudinally outer face of a said longitudinally outer lip on the other of said side walls and extending laterally therefrom, relative to said imaginary medial plane, to a respective laterally outer free end thereof;

said free ends of the respective said lips on said one side wall being gapped laterally from the respective said lips on said other side wall when said flange-retaining lips are in a free, unflexed condition, by an amount which is less than the thickness of said flange;

a resilient, flexible seal based on said body trim member externally of said channel and positioned to resiliently sealingly engage with a longitudinally inner surface of said closure panel as said closure panel is moved towards said flange for obstructingly closing said aperture;

a resilient, flexible body seal lip based on said body trim member externally of said channel on said other of said side walls and extending laterally therefrom, relative to said imaginary medial plane, to a free end;

said automotive body trim member adapted to be installed on said automobile body so that said flange is received in said channel with said lips flexed laterally away from one another towards said free ends thereof by engagement with opposite sides of said flange, with said body seal lip, towards said free end thereof, resiliently deflected by engagement with an outer surface of said automobile body beside said flange, and with said sub-lips, towards said free ends thereof, deflected into engagement with inner surfaces of respective ones of said side walls of said automotive body trim member within said groove for bracing the respective said lips against the respective said sidewalls for preventing undesirable cocking of said automotive body trim member due to engagement of said body seal lip with said body surface and resulting resilient deflection of said body seal lip, as said automotive body trim member is being installed on said flange.

6. A weather strip arrangement for the perimeter of a closable opening of the body of an automobile, said arrangement comprising:

an automobile body having an opening comprising an aperture through a wall, so that said aperture is bounded by said wall about the perimeter thereof; said wall having an outer surface; a flange based on said wall and protruding outwardly from said wall about the perimeter of said aperture so as to have an upstanding free edge; and a closure panel which is broader than said aperture and which may be moved towards and away from said flange for obstructingly closing, and non-obstructively opening said aperture, an automotive body trim member having a U-shaped transverse cross-sectional shape comprising two laterally-spaced opposite side walls with an end wall extending transversely between said side walls so as to define a longitudinally inwardly-opening channel, across which said side walls confront one another; each said side wall having an inner surface extending with said channel;

at least two resilient, flexible flange-retaining lips based on the respective inner surface of each of said side walls, longitudinally inwardly of said end wall and extending obliquely longitudinally outwardly from the respective side wall on which it is based, so that each said flange-retaining lip has a free end disposed nearer an imaginary medial plane bisecting said channel and nearer said end wall of said channel, and a base end disposed on the respective said side wall further from said imaginary medial plane, and further from said end wall; said flange-retaining lips on each said side wall being based thereon at respective sites which are spaced longitudinally from one another, so that on each said side wall, at least one said flange-retaining lip is a longitudinally inner lip and at least another said flange-retaining lip is a longitudinally outer lip; each said lip between the base end thereof and the free end thereof having a longitudinally inner face and a longitudinally outer face;

a first sub-lip based on the longitudinally outer face of a said longitudinally inner lip on one of said side walls and extending laterally therefrom, relative to said imaginary medial plane, to a respective laterally outer free end thereof;

a second sub-lip based on the longitudinally outer face of a said longitudinally outer lip on the other of said side walls and extending laterally therefrom, relative to said imaginary medial plane, to a respective laterally outer free end thereof;

said free ends of the respective said lips on said one side wall being gapped laterally from the respective said lips on said other side wall when said flange-retaining lips are in a free, unflexed condition, by an amount which is less than the thickness of said flange;

a resilient, flexible seal based on said body trim member externally of said channel and positioned to resiliently sealingly engage with a longitudinally inner surface of said closure panel as said closure panel is moved towards said flange for obstructingly closing said aperture;

a resilient, flexible body seal lip based on said body trim member externally of said channel on said other of said side walls and extending laterally therefrom, relative to said imaginary medial plane, to a free end;

said automotive body trim member being installed on said automobile body so that said flange is received in said channel with said lips flexed laterally away from one another towards said free ends thereof by engagement with opposite sides of said flange, with said body seal lip, towards said free end thereof, resiliently deflected by engagement with an outer surface of said automobile body beside said flange, and with said sub-lips, towards said free ends thereof, deflected into engagement with inner surfaces of respective ones of said side walls of said automotive body trim member within said groove for bracing the respective said lips against the respective said sidewalls for preventing undesirable cocking of said automotive body trim member due to engagement of said body seal lip with said body surface and resulting resilient deflection of said body seal lip, as said automotive body trim member is being installed on said flange.

7. A weather strip according to claim 1, wherein: said trim portion including said U-shaped section and said flange-retaining lips are made of solid rubber, and said seal portion and said body seal lip are made of sponge rubber.

* * * * *